(12) United States Patent
Zalevsky (10) Patent No.: US 11,867,625 B2
(45) Date of Patent: Jan. 9, 2024

(54) SYSTEM AND METHOD FOR IMAGING VIA SCATTERING MEDIUM

(71) Applicant: BAR ILAN UNIVERSITY, Gan (IL)

(72) Inventor: Zeev Zalevsky, Rosh HaAyin (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 292 days.

(21) Appl. No.: 17/427,800

(22) PCT Filed: Jan. 30, 2020

(86) PCT No.: PCT/IL2020/050116
§ 371 (c)(1),
(2) Date: Aug. 2, 2021

(87) PCT Pub. No.: WO2020/157759
PCT Pub. Date: Aug. 6, 2020

(65) Prior Publication Data
US 2022/0163444 A1    May 26, 2022

Related U.S. Application Data

(60) Provisional application No. 62/800,505, filed on Feb. 3, 2019.

(51) Int. Cl.
*G01N 21/47*    (2006.01)
(52) U.S. Cl.
CPC .................................. *G01N 21/47* (2013.01)
(58) Field of Classification Search
CPC ............... G01N 21/47; G01N 21/4795; G02B 21/0056; G03H 1/2294; G03H 2001/0083; G03H 2222/36
See application file for complete search history.

(56) References Cited

U.S. PATENT DOCUMENTS

2012/0095533 A1    4/2012 Wang
2012/0182558 A1    7/2012 Masumura
(Continued)

FOREIGN PATENT DOCUMENTS

CN    105866035 A    8/2016
CN    106200276 A    12/2016
(Continued)

OTHER PUBLICATIONS

Qiao, Yangi , et al., "Second-harmonic focusing by nonlinear turbid medium via feedback-based wavefront shaping", arxiv.org, Cornell University Library, 201 Olin Library Cornell University Ithaca, NY 14853, Dec. 2, 2016 (Dec. 2, 2016), XP080736253.
(Continued)

*Primary Examiner* — Tony Ko
(74) *Attorney, Agent, or Firm* — Dorsey & Whitney LLP (57) ABSTRACT

A system for use in imaging through diffusive media is presented. The system comprising: an imaging unit comprising light source unit comprising light source(s) providing coherent illumination with selected wavelength range, and a spatial light modulator configured for selectively varying spatial pattern of wavefront of light generated by the light source(s); a collection unit comprising detector array(s) and located next to said light source unit for collecting light reflected from a sample illuminated by said light source unit. And a control system comprising processing unit(s) and connected to said light source unit and said collection unit, said control system is configured for selectively varying spatial pattern of wavefront of light generated by the light source(s) in accordance with spatial pattern of light collected by said detector array(s) of the collection unit to satisfy a reflectance condition indicative of relation between wavefront spatial pattern and collected light spatial pattern.

14 Claims, 7 Drawing Sheets

(56) References Cited

U.S. PATENT DOCUMENTS

| | | | |
|---|---|---|---|
| 2014/0049631 A1 | 2/2014 | Sun et al. | |
| 2016/0377423 A1 | 12/2016 | Eilers et al. | |
| 2017/0176338 A1 | 6/2017 | Wu et al. | |
| 2017/0254932 A1 | 9/2017 | Huang et al. | |
| 2018/0010961 A1 | 1/2018 | Masumura | |
| 2019/0290124 A1* | 9/2019 | Laforest | A61B 3/12 |

FOREIGN PATENT DOCUMENTS

| | | |
|---|---|---|
| JP | 2018008040 A | 1/2018 |
| WO | 2017205857 A1 | 11/2017 |

OTHER PUBLICATIONS

Asraf, et al., "Brillouin Optical Spatial Fourier Domain Analyzer", Optical Engineering, Jan. 2015, pp. 011009-1-011009-7.

Edrei, et al., "Optical Imaging Through Dynamic Turbid Media Using the Fourier-Domain Shower-Curtain Effect", Conference on Lasers and Electro-Optics, Jan. 2016, pp. 71-74.

Gibson, et al., "Recent Advances in Diffuse Optical Imaging", Physics in Medicine and Biology, Feb. 2005, pp. R1-R43.

He, et al., "Image Restoration Through Thin Turbid Layers by Correlation with a Known Object", Optics Express, May 2013, pp. 12539-12545.

Huang, et al., "Optical Coherence Tomography", Science, Nov. 1991, pp. 1178-1181.

Katz, et al., "Non-Invasive Real-Time Imaging Through Scattering Layers and Around Corners via Speckle Correlations", Nat Photonics, 2014, pp. 1-14.

Kennedy, et al., "Particle Swarm Optimization", Proceedings of ICNN95—International Conference on Neural Networks., 1995, pp. 1942-1948.

Malka, et al., "Super-Resolved Raman Spectroscopy", Spectroscopy Letters, 2013, pp. 307-313.

Mosk, et al., "Controlling Waves in Space and Time for Imaging and Focusing in Complex Media", Nature Photonics, May 2012, pp. 283-292.

Popoff, et al., "Measuring the Transmission Matrix Optics: An Approach to the Study and Control of Light Propagation in Disordered Media", Physical Review Letters, Mar. 2010, pp. 100601-1-100601-4.

Schechtman, et al., "Phase Retrieval with Application to Optical Imaging", IEEE Signal Processing Magazine, May 2015, pp. 87-109.

Shih, "The Physics of Turbulence-Free Ghost Imaging", Technologies, Dec. 2016, pp. 1-15.

Vellekoop, et al., "Exploiting Disorder for Perfect Focusing", Nature Photonics, May 2010, pp. 320-322.

Vellekoop, et al., "Focusing Coherent Light Through Opaque Strongly Scattering Media", Optics Letter, Aug. 2007, pp. 2309-2311.

Wu, et al., "Lensless "Ghost" Imaging with Thermal Light Sources (Abstract)", AIP Conference Proceedings, Apr. 2009, pp. 249.

Wu, et al., "Lensless Wide-Field Single-Shot Imaging Through Turbid Media Based on Object-Modulated Speckles", Applied Optics, 2017, 7 pages.

Xu, et al., "Is Ghost Imaging Intrinsically More Powerful Against Scattering?", Optics Express, Dec. 2015, pp. 32993-33000.

Zhang, et al., "Tabletop X-Ray Ghost Imaging with Ultra-Low Radiation", Optica, Apr. 2018, pp. 374-377.

* cited by examiner

Full Scattering Surface

FIG. 3B

Effective Scattering Area
after masking

FIG. 9

SYSTEM AND METHOD FOR IMAGING VIA SCATTERING MEDIUM

TECHNOLOGICAL FIELD

The present invention is in the field of imaging techniques and relates to an imaging method and system for imaging a region of interest inside or behind a scattering medium.

BACKGROUND ART

References considered to be relevant as background to the presently disclosed subject matter are listed below:
[1]. D. Huang, E. A Swanson, C. P. Lin, J. S. Schuman, W. G. Stinson, W. Chang, J. G. Fujimoto, "Optical coherence tomography," Science, 254(5035), 1178-1181 (1991).
[2]. A. P. Gibson, J. C. Hebden, and S. R. Arridge, "Recent advances in diffuse optical imaging," Physics in Medicine and Biology 50(4) (2005).
[3]. O. Katz, P. Heidmann, M. Fink, and S. Gigan, "Non-invasive single-shot imaging through scattering layers and around corners via speckle correlations," Nat. Photonics 8, 784 (2014).
[4]. E. Edrei and G. Scarcelli, "Optical imaging through dynamic turbid media using the Fourier-domain shower-curtain effect," Conference on Lasers and Electro-Optics (2016).
[5]. P. Wu, Z. Liang, X. Zhao, L. Su, L. Song, "Lensless wide-field single-shot imaging through turbid media based on object-modulated speckles," Applied Optics 56(12), 3335 (2017).
[6]. Y. Shechtman, Y. C. Eldar, O. Cohen, H. N. Chapman, J. Miao, M. Segev, "Phase Retrieval with Application to Optical Imaging: A contemporary overview," IEEE Signal Processing Magazine 32(3), 87-109 (2015).
[7]. L. A. Wu, B. K. Hartline, R. K. Horton, C. M. Kaicher, "Lensless 'Ghost' Imaging with Thermal Light Sources (abstract)," AIP Conference Proceedings (2009).
[8]. Y. Shih, "The Physics of Turbulence-Free Ghost Imaging," Technologies 4(4), 39 (2016).
[9]. Y. K. Xu, W. T. Liu, E. F. Zhang, Q. Li, H. Y. Dai, P. X. Chen, "Is ghost imaging intrinsically more powerful against scattering?," Optics Express 23(26), 32993 (2015).
[10]. A.-X. Zhang, Y.-H. He, L.-A. Wu, L.-M Chen, B.-B. Wang, "Tabletop x-ray ghost imaging with ultra-low radiation," Optica 5(4), 374 (2018).
[11]. I. M. Vellekoop, A. P. Mosk, "Focusing coherent light through opaque strongly scattering media," Optics Letters 32(16), 2309 (2007)
[12]. S. M. Popoff, G. Lerosey, R. Carminati, M. Fink, A. C. Boccara, S. Gigan, "Measuring the Transmission Matrix in Optics: An Approach to the Study and Control of Light Propagation in Disordered Media," Physical Review Letters 104(10) (2010).
[13]. A. P. Mosk, A. Lagendijk, G. Lerosey, M. Fink, "Controlling waves in space and time for imaging and focusing in complex media," Nature Photonics 6(5), 283-292 (2012).
[14]. I. M. Vellekoop, A. Lagendijk, A. P. Mosk, "Exploiting disorder for perfect focusing," Nature Photonics 4(5), 320-322 (2010).
[15]. H. He, Y. Guan, J. Zhou, "Image restoration through thin turbid layers by correlation with a known object," Optics Express 21(10), 12539 (2013).
[16]. J. Kennedy, R. Eberhart, "Particle swarm optimization," Proceedings of ICNN95-International Conference on Neural Networks.

Acknowledgement of the above references herein is not to be inferred as meaning that these are in any way relevant to the patentability of the presently disclosed subject matter.

BACKGROUND

Imaging through scattering media has potentially wide range of application especially in imaging through biological tissues. Random scattering of light when it passes through a scattering media makes it difficult to image the objects behind it and such scattering media are typically seem opaque. Several methods have been proposed for imaging through a diffusing media, including Optical Coherence Tomography (OCT), Diffusion Tomography, X-Ray and Ultrasound and several other techniques.

The optical memory effect of speckles was used as a tool for phase retrieval in inverse scattering problems. However, phase retrieval algorithms are typically noise sensitive, resulting in high number of errors in reconstruction of objects being imaged. Ghost imaging may also be used as a tool to retrieve the information of an unknown object. This technique, however, requires use of a reference beam rendering it limited for various applications.

Recently developed techniques utilize the deterministic nature of the light scattering through a random media to focus light through it. Wavefront Shaping emerged out to be one of the effective tools for focusing light through a scattering media.

GENERAL DESCRIPTION

There is a need in the art in a novel approach for high-resolution imaging inside and behind scattering media. Such technique may provide for imaging through biological scattering medium while avoiding a need for direct access to the scattering medium or another side of the medium. Further, the present technique allows imaging without the need to know the scattering properties of the medium beforehand.

As described above, wavefront shaping is known to be one of the effective tools for focusing light through a scattering media. Some known techniques perform wavefront shaping of light directed to a scattering medium and collecting light components at other side of the medium by a camera unit. The wavefront shaping is performed using light phase is modulated by a spatial light modulator (SLM), where the phase pattern is modulated using feedback from the camera to provide a focusing spot behind the scattering medium. The wavefront is changed by optimization until a focused spot is obtained on the camera. Other techniques utilize measurement of the transmission matrix of a scattering media and use the measured matrix to introduce inverse phase to wavefront using SLM to get a focused spot behind the scattering media. Such techniques require an initial calibration to find the complete transmission matrix.

Thus, these known techniques require prior knowledge of the scattering media or need to have access to the back of it. These limitations render the known technique not optimal and not suitable for problems involving a non-invasive focusing of light behind biological tissues.

The present invention provides a novel imaging technique, which utilizes illumination wavefront shaping in an optical scheme where both the illumination and the detection are on the same side of a scattering medium, while a region of interest being imaged is somewhere inside or behind the scattering medium. Generally, the present technique is based on the inventor's understanding that the scattering characteristics of the medium are generally similar. Accordingly, the present technique utilizes selection of wavefront pattern that when directed into the scattering medium, generates a focusing spot at certain depth into the medium. Some light components reflected from the focusing spot return in the direction of illumination and pass through substantially similar scattering characteristics of the medium. Also, the present invention advantageously provides imaging of the region of interest that does not require to capture and process large plurality of images.

More specifically, the present invention is based on the inventors' understanding that light propagation in scattering medium can be represented by a first scattering operator operating of input wavefront, where light returning after passes through the same medium and may thus be represented by a second scattering operator, having certain correspondence with the first scattering operating (e.g. inverse thereof). Accordingly, by encoding input wavefront, transmitted toward sample made of scattering medium, focusing spot at certain depth into the sample may be identified be measuring pattern of light returned (reflected) from the sample and varying the encoding of the input wavefront to satisfy a condition associated with a relation between spatial pattern of the input wavefront and spatial pattern of the light returned (reflected) from the sample. Generally, such reflectance condition may be associated with similarity of the spatial intensity pattern of the input light and the collected light reflected from the sample, up to certain lose scalar and variation threshold. Generally, input wavefront that satisfies such condition, generates focusing spot at certain depth into the sample. Accordingly, the present technique enables imaging of objects through (or within) scattering medium, while avoiding the need for reaching at other side of the medium.

Further, as the scattering characteristics of the sample may be relatively similar across the sample, directing similarly encoded input wavefront at different locations onto the sample typically provides substantially similar focusing at the certain depth, with shift in location in accordance with the input location. Thus, after identifying suitable wavefront encoding directed to one or more locations on the sample, the present technique enables scanning of the sample for obtaining image data of a certain depth within the sample. Generally, the image data may be determined in accordance with scalar relation between input intensity wavefront and collected output intensity, being indicative of reflection at the focusing spot. Accordingly, the present technique utilizes scanning of the sample to provide imaging at certain depth behind the scattering medium. The present technique utilizes optimizing process for determining suitable input wavefront encoding and enables scanning of the sample without the need to repeat optimization of the wavefront encoding. This generally applied up to certain limiting ranges and medium characteristics and is based on the assumption that the scattering medium is generally uniform in its macro properties.

Thus, according to one broad aspect, the present invention provides a system for use in imaging through diffusive media, the system comprising: an imaging unit comprising
light source unit comprising at least one light source providing coherent illumination with selected wavelength range and spatial light modulator configured for selectively varying spatial pattern of wavefront of light generated by the at least one light source;
a collection unit comprising at least one detector array and located next to said light source unit for collecting light reflected from a sample being illuminated by said light source unit;
and a control system comprising at least one processing unit and connected to said light source unit and said collection unit, said control system is configured for selectively varying spatial pattern of wavefront of light generated by the at least one light source in accordance with spatial pattern of light collected by said at least one detector array of the collection unit to satisfy a reflectance condition indicative of relation between spatial pattern of the wavefront and spatial pattern of collected light.

According to some embodiments, the reflectance condition may be a condition that intensity pattern of collected light is spatially similar, up to constant lose and predetermined threshold variation, to spatial intensity pattern of wavefront of light generated by the at least one light source.

According to some embodiments, the reflectance condition may correspond to $I_{in}(x) \approx kI_{out}(x)$, where $I_{in}(x)$ is intensity pattern formed by said spatial pattern of wavefront of generated light, $I_{out}(x)$ is collected intensity pattern, and k is a measure indicative of lose and reflection from a focus region at certain depth into the sample.

According to some embodiments, the imaging unit may be positioned on a moving platform, said control system is connected to said platform for selectively varying transverse location of the imaging unit with respect to said sample.

According to some embodiments, the control system may be configured for varying transverse location of the imaging unit with respect to the sample and verifying said reflectance condition in a selected number of different locations.

According to some embodiments, the control unit may be configured for selectively varying transverse location of the imaging unit with respect to the sample thereby scanning a selected region of the sample, variation in total intensity of collected light pattern being indicative of reflection from a focusing spot at certain depth into the sample, said scanning thereby provides image data indicative of said certain depth into the sample.

According to some embodiments, the processing unit may comprise a scattering matrix module configured for using data of spatial pattern of wavefront of light suitable to satisfy said reflectance condition for determining an estimated scattering matrix for said sample.

According to some embodiments, the processing unit may further comprise pattern determining module, said pattern determining module being configured for receiving data on the estimated scattering matrix and using said estimated scattering matrix for determining one or more wavefront patterns suitable for generating focus region within the scattering medium at selected depths.

According to on other broad aspect, the present invention provides a method for imaging through scattering medium, the method comprising: directing coherent illumination wavefront having selected wavelength range and selected spatial pattern onto a sample; collecting light returning from the sample and determining spatial pattern of collected light; determining a relation between said selected spatial pattern of the coherent illumination wavefront and spatial pattern of collected light; varying spatial pattern of the coherent illumination wavefront until said relation in within predetermined reflectance condition.

According to some embodiments, the predetermined reflectance condition is selected to satisfy a condition that spatial pattern of collected light is spatially similar, up to constant lose and predetermined threshold variation, to spatial pattern of the coherent illumination wavefront.

According to some embodiments, the predetermined reflectance condition corresponds to $I_{in}(x) \approx kI_{out}(x)$, where $I_{in}(x)$ is intensity pattern formed by said spatial pattern of wavefront of generated light, $I_{out}(x)$ is collected spatial intensity pattern, and k is a measure indicative of lose and reflection from a focus region at certain depth into the sample.

According to some embodiments, the method may further comprise varying relative transverse location of illumination with respect to the sample.

According to some embodiments, the method may further comprise determining said reflectance condition in a selected number of different transverse locations on the sample.

According to some embodiments, the method may further comprise comprising scanning a selected region of the sample, for each measurement position on the sample determining variation in total intensity of collected light pattern with respect to total intensity of said coherent illumination wavefront, and determining data on reflection level arriving from a focusing spot at certain depth into the sample, and generating image data indicative of said certain depth into the sample in accordance with said scanning.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
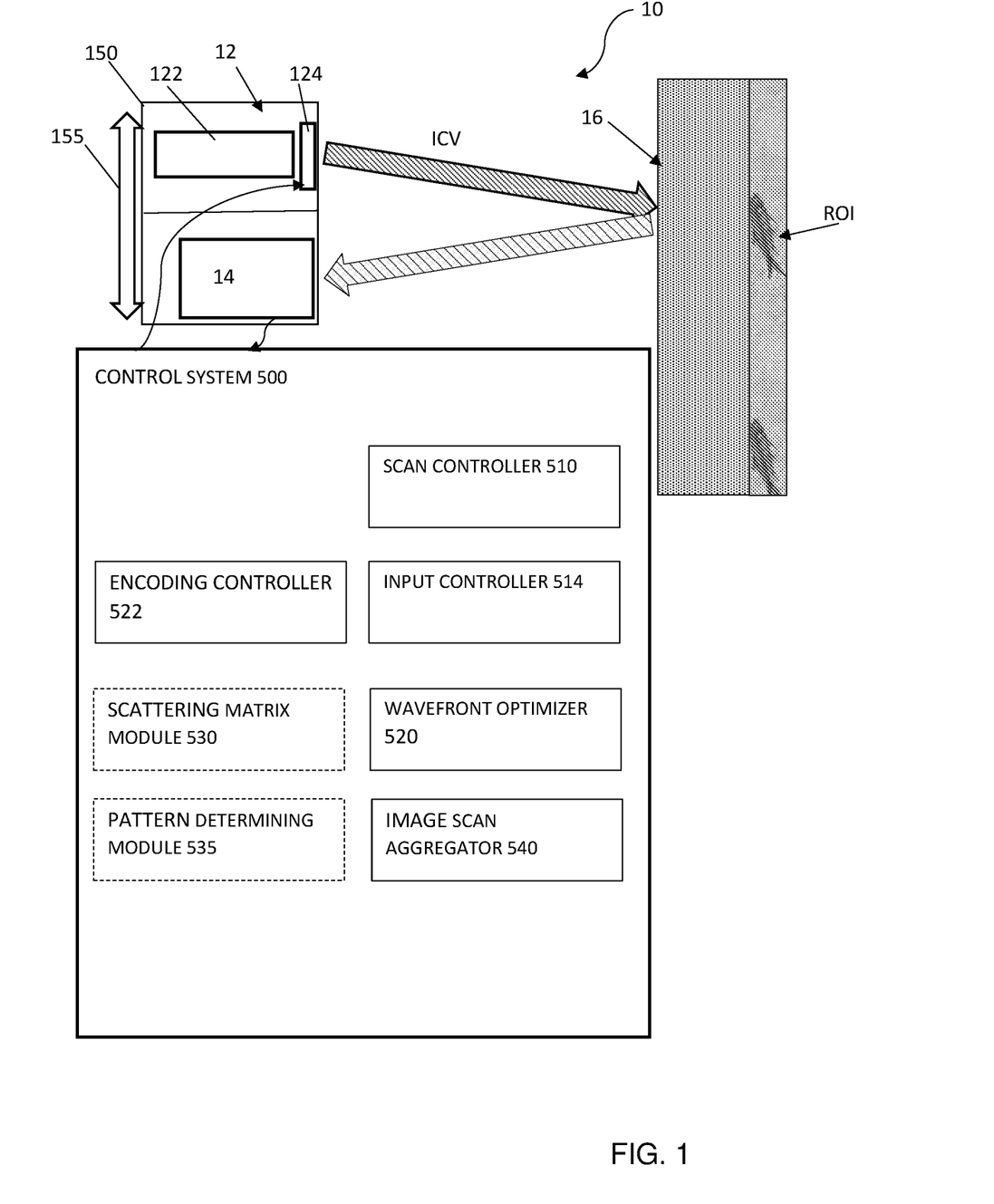
FIG. 1 schematically illustrates a system according to some embodiments of the present invention.

As indicated above, the present technique provides for imaging system capable of imaging through or behind scattering medium. FIG. 1 illustrates imaging system 10 according to some embodiments of the present invention. The imaging system 10 is configured and operable for use in imaging a region of interest ROI located behind (or somewhere inside) a scattering medium 16. Generally, as described in more details below, system 10 may be configured for imaging the region of interest ROI by scanning point by point of the region of interest and reconstruct the complete image based on the scanning output. System 10 includes a light source system 12 including a light source (e.g. laser light source) 122 spatial light modulator 124 (e.g. spatial phase modulator SLM, or digital mirror modulator DMD etc.) and a collection unit 14, e.g. camera unit. The light source system 12 is configured for generating light having predetermined wavelength range and selected spatial pattern, directed toward a region on the scattering medium 16. Generally, the light source system 12 and collection unit 14 define an imaging unit 150, the imaging unit 150 may be mounted on a moving platform capable of being selectively moveable along one or more axes 155 for scanning a region of the scattering medium 16.

The imaging unit 150 is connectable to a control unit 500 configured for operating light source system 12 and collection unit 14, as well as the moving platform 155, for selecting spatial pattern of light generating a focus spot at certain depth into the scattering medium 16 and collecting light returning from the medium 16. The control unit utilizes data on the collected light, from one or more regions of the scattering medium, for determining image of a region of interest ROI at the certain depth within the medium 16. The control unit 500 includes at least one processing unit (processor) and memory unit and may also include a user interface module and communication module (input/output module), which are not specifically shown here. The memory unit generally carries instructions for operating the imaging unit for obtaining image data indicative of the region of interest at depth within the scattering medium 16. The control unit 500 generally configured for performing one or more actions including selecting suitable illumination pattern for obtaining image data, determining scattering operating and utilizing the scattering operator for determining additional illumination patterns for one or more selected depths, and operating the platform 155 and imaging unit 150 for obtaining image data of the region of interest ROI. In some configurations, the control unit 500 may also determine reconstructed image data using the data collected by the collection unit as described further below.

The control unit is typically configured for selecting suitable illumination encoding that allows obtaining data on the region of interest ROI. To this end the control unit utilizes one or more optimization techniques by controlling the spatial light modulator 124 for selectively varying spatial pattern of wavefront of light generated by the light source 122. To this end the control unit operates to select illumination encoding pattern, direct light having the selected spatial pattern onto the scattering medium and is responsive to data from the collection unit. The collection unit collects light returning from the scattering medium 16 and transmits collected light pattern to the control unit 500. Thus, the control unit is configured to change the spatial encoding pattern of illumination to satisfy a predetermine reflectance condition relating relation between the illumination encoding and pattern of collected light. Generally, in some embodiments, the reflectance condition relates to intensity pattern of collected light being spatially similar, up to constant lose and predetermined threshold variation, to spatial intensity pattern of wavefront of light generated by the at least one light source. For example, the reflectance condition may be in the form $I_{in}(x) \approx kI_{out}(x)$, where $I_{in}(x)$ is intensity pattern formed by the spatial encoding of the illumination, $I_{out}(x)$ is collected intensity pattern, and k is a measure indicative of lose and reflection from a focus region at certain depth into the sample.

In this connection, the control unit may generally be configured as a computer system including input and output connections, memory utility and one or more processors that are not specifically shown. The one or more processors are configured for operating based on computer readable code including instructions for operating represented by one or more modules including scan controller 510, encoding controller 522, input controller 514, wavefront optimizer 520, scattering matrix module 530, and image scan aggregator 540. Once an initial encoding is selected, the encoding controller 522 generates and transmits encoding data to the spatial light modulator 124 for encoding input wavefront $E_{in}(x)$ that is directed onto the scattering medium 16. Light pattern data collected by the collection unit 14 is transmitted and received at the input controller 514 for determining data on pattern of collected light $I_{out}(x)$. The wavefront optimizer 520 received data on the encoding pattern $E_{in}(x)$, to determine data on input intensity pattern $I_{in}(x)$, as well as data on the collected light pattern $I_{out}(x)$, and utilized one or more optimizing techniques for selecting suitable encoding that results in relation between $I_{in}(x)$ and $I_{out}(x)$ that satisfies desired reflectance condition, generally in the form $I_{in}(x) \approx kI_{out}(x)$. It should be noted that the relation between the encoding pattern $E_{in}(x)$ and the input intensity pattern $I_{in}(x)$ may be determined by $I_{in}(x)=|E_{in}(x)|^2$.

When the condition on relation between spatial patent of input light and that of the collected light is achieved, it is assumed the at least a portion of the input light generates a focus region at certain depth within the scattering medium 16, and that light reflected from material at that focus region passes through substantially similar scattering properties on the way back toward the collection unit 14. To verify this assumption, the scan controller 510 may typically vary location of the imaging unit 150 to illumine the scattering material at shifted location. According to the scattering model described further below, the reflectance condition is kept between shifts in location on the scattering medium 16. More specifically, if the wavefront encoding does not result with focus region within depth into the scattering medium 16, any shift in location will result in variations in the pattern of the collected light. This is while if the wavefront encoding does provide focus region within the material, isotropy of the scattering characteristics of the scattering medium, will result in substantially similar pattern of the collected light.

Having selected a suitable wavefront encoding, the scan controller 510 may operate the moving platform 155 for varying location of illumination, thereby scanning a region of the scattering medium 16. For each location, the collected light pattern in compared to intensity pattern of the input wavefront, to determine reflectance parameter k. the reflectance parameter is indicative of lose due to scattering, but also indicative of reflectance of material located at the focus region. The image scan aggregator 540 collects data on the reflectance parameter k for each location for constructing image data indicative of the region within depth into the scattering medium 16.

In some embodiments, the scattering matrix module 530 may utilize data on suitable wavefront encoding pattern $E_{in}(x)$ for determining an estimated scattering matrix operator A, providing the desired focus region. More specifically, the scattering matrix operator A is determined in accordance with the requirement that $A \cdot E_{in}(x)$ provides a basis vector representing illumination arriving only at the focus region up to energy lose due to scattering. In some configurations, the scattering matrix operator may be used for determining wavefront encoding patterns suitable for generating focus region at selected depths, generally different than the certain depth for which wavefront encoding pattern is determined by optimization. To this end, the processing unit of the control unit may also include a pattern determining module 535 configured for receiving data on the estimated scattering matrix A and using said estimated scattering matrix for determining one or more wavefront patterns suitable for generating focus region within the scattering medium at selected depths. Further, the pattern determining module 535 may also be used for determining wavefront patterns enabling scanning of the scattering matrix by generating additional focus regions formed using a common wavefront pattern of illumination.

As generally described above, the present invention utilizes illumination and detection is on the same side of the medium. This implies that the incident light passes twice through the same medium, which forms the basis of the modelling described below. Further the wavefront encoding is provided by a spatial light modulator, such as Digital Micromirror Device (DMD) or any other light modulator system. The terms DMD of SLM are used herein below interchangeably and should be understood broadly as relating to any type of spatial light modulating unit. Generally, in some embodiments, the present technique may attempt to estimate the scattering function and to selectively encode the wavefront of the illuminating laser light source (with the DMD) with an inverse scattering function of the scattering medium, such that after passing its scattering function a focused beam is obtained. This wavefront is obtained after passing twice through the same scattering medium (on the way front and on the way back). To estimate the encoded inverse wavefront that will be focused after passing the above-mentioned scattering we use the following modeling: assume that the scattering medium can be modeled by a sequence of operator multiplications while the first is an operator of random phase and the second is the operator of short free space propagation of dz, where dz is the average scattering length in the inspected tissue (scattering medium). This couple of operators is repeated until the number of repeats equals to M=L/dz (or greater) where L is the distance of the target behind the media from the point of illumination. Thus, the scattering matrix A can be written as:

(equation 1)

$$A = \left[ [F_{ij}]^* \right.$$

-continued $$\begin{bmatrix} e^{-i\pi\lambda dz\mu_j^2} & \cdots & 0 & 0 \\ \vdots & \ddots & 0 & \vdots \\ 0 & \cdots & e^{-i\pi\lambda dz\mu_j^2} & 0 \\ 0 & 0 & 0 & e^{-i\pi\lambda dz\mu_j^2} \end{bmatrix}$$

Free Space Propagation Matrix $$[F_{ij}] \begin{bmatrix} P_{11} & \cdots & 0 & 0 \\ \vdots & \ddots & 0 & \vdots \\ 0 & \cdots & P_{N-1N-1} & 0 \\ 0 & 0 & 0 & P_{NN} \end{bmatrix}^M$$

Phase Scattering Matrix where $[F_{ij}]$ and $[F_{ij}]^*$ are Fourier and inverse Fourier operators (matrix).

This provides that $E_{out_j}(x_j) = A^{t*}A^*E_{in_j}(x_j)$. It is to be noted that matrix A is Unitary (omitting the energy lose due to scattering) since it is the production of multiplication of two unitary matrices.

The operator matrix A is applied twice in the model as there is double passing through the scattering medium (on the way forward and on the way back). On the way back, the scattering is in inverse order and therefore the transpose operation was applied on the matrix A. We want to find the input phase vector $E_{in}(x)$ such that after one passage a focus is obtained, i.e. the operator A produces a delta function in the middle of the spatial axis:

$$\begin{bmatrix} 0 \\ 0 \\ 1 \\ 0 \\ 0 \end{bmatrix} = A * E_{in_j}(x_j) \quad \text{(equation 2)}$$

Thus, one can extract that:

$$(A^t)^{-1} * E_{out_j}(x_j) = A * E_{in_j}(x_j) = \begin{bmatrix} 0 \\ 0 \\ 1 \\ 0 \\ 0 \end{bmatrix} \quad \text{(equation 3)}$$

And therefore:

$$E_{out_j}(x_j) = A^t \begin{bmatrix} 0 \\ 0 \\ 1 \\ 0 \\ 0 \end{bmatrix} = A^2_{N/2_j} \quad \text{(equation 4)}$$

Where N is the number of spatial sampling points along the output axis or the geometrical resolution of wavefront encoding. From equation 2, $E_{in}$ equals to the middle column of the matrix operator inverse A:

$$E_{in_j}(x_j) = A^{-1} * \begin{bmatrix} 0 \\ 0 \\ 1 \\ 0 \\ 0 \end{bmatrix} = A^{-1}_{\frac{N}{2}j} \quad \text{(equation 5)}$$

Since A is a Unitary matrix then there is a known relation between A transpose ($A^t$) and inverse A ($A^{-1}$).

$$A^{-1} = A^* \quad \text{(equation 6)}$$

Where * denotes conjugate transpose of the matrix A.

From by combining equations 4, 5 and 6; it shows that $E_{out_j}^*(x_j) = E_{in_j}(x_j)$. Hence, we obtain the desired $E_{in_j}(x_j)$ to be applied on the SLM for obtaining a focused spot after first passage through the medium, as well as a condition to determine $E_{in}$ using collected light pattern returning from the medium.

Figure 2:
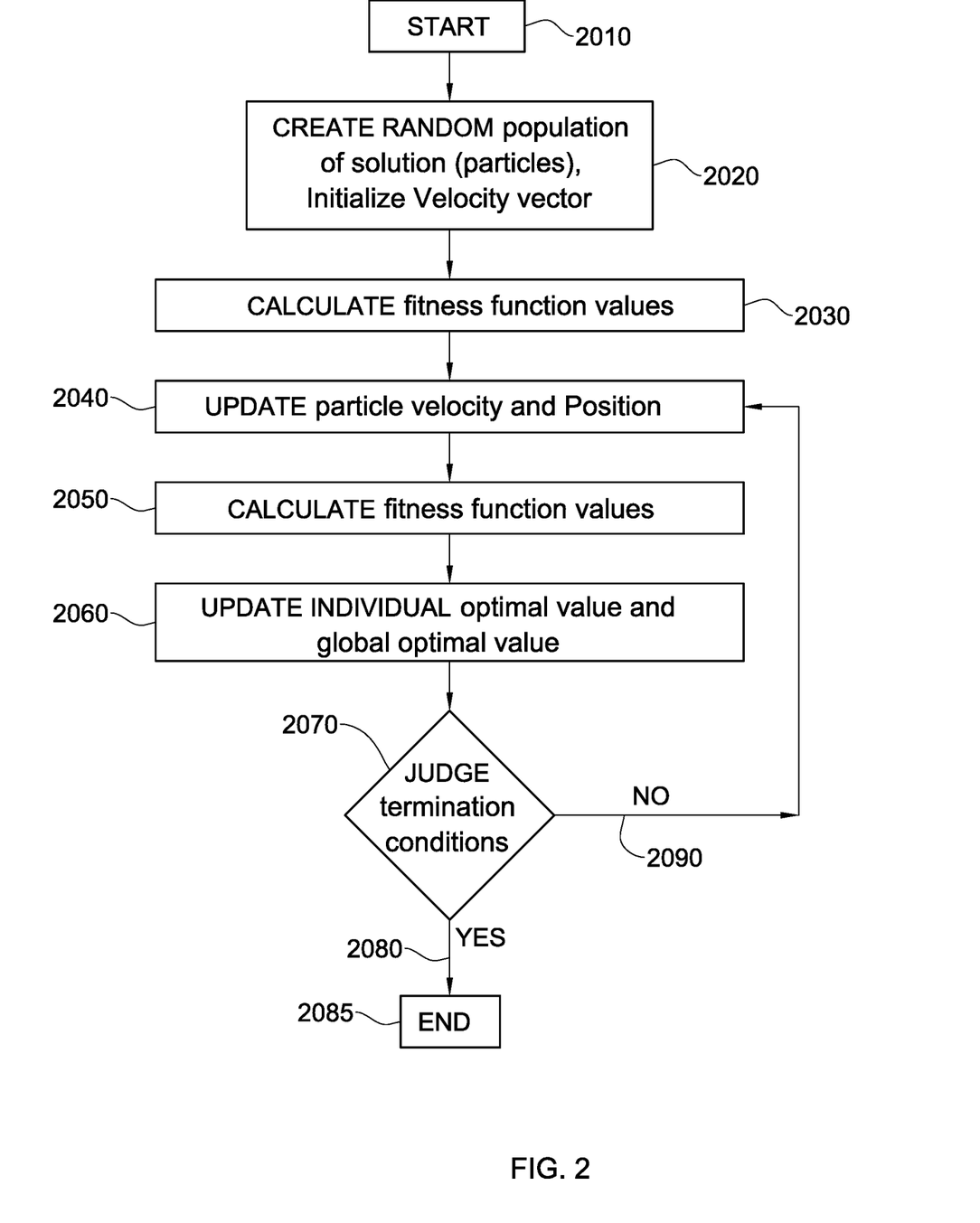
FIG. 2 shows a flow chart diagram exemplifying selection of input wavefront pattern by optimization according to some embodiments of the present invention.

Obviously, the above described model is an approximation and thus the obtained analytical result is just the starting iteration point of the distribution to be displayed on the SLM around which a close loop convergence process needs to be applied to really have the focus after first pass. The most appropriate way to deal with it is to use capture the phase of the output field and perform optimization using phase modulation of the incident light. However, to prove the concept we chose to perform Amplitude Modulation. We followed Particle Swarm Optimization (PSO) technique to perform the closed loop optimization. Reference is made to FIG. 2 illustrating a flow chart describing the actions associated in PSO. The objective function in the PSO is defined in this example by the correlation between the intensity of the output beam ($I_{out_j}(x_j)$) and that of the input beam ($I_{in_j}(x_j)$). Hence $$I_{out_j}(x_j) = k' I_{in_j}(x_j) \quad \text{(equation 7)}$$

As shows in FIG. 2, the PSO technique is initiated 2010 (start), and determines an initial random population of solutions 2020. The concept of this technique relates to the solutions as particles having certain initial velocity vector associated with the solution. Fitness of the solution population is determined by calculating values for a fitness function 2030. The solutions are updates 2040 based on velocity and position thereof (may be associated with the solution properties and fitness values), and the fitness function values is re-calculated 2050. The optical values of each individual solution are updated to determine a global optimal value 2060, and termination conditions are checked 2070. The termination conditions may be associated with number of cycles, optimal value, etc. If the termination condition is determined as positive 2080, the algorithm ends 2085 and provides output in form of optimal values and corresponding solution. In case the termination conditions are not met 2090, the technique repeats itself by updating the solutions velocity and position 2040 and calculating fitness values 2050.

Simulation Results

Figure 3A:
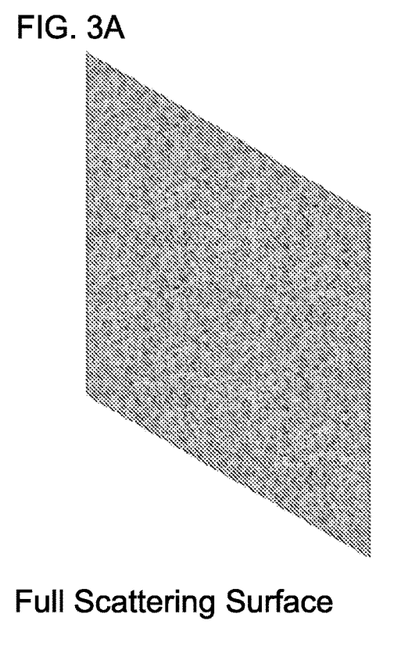
FIGS. 3A and 3B illustrated 1D concept in simulation of the technique according to some embodiments of the present invention.
Figure 3B:
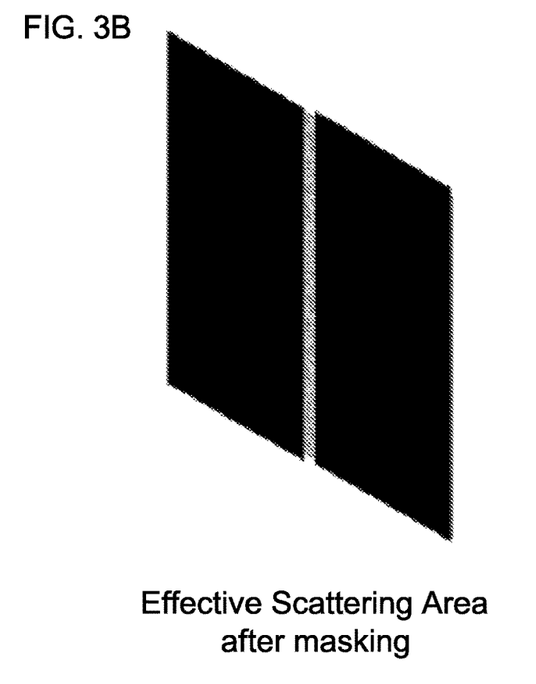

The inventors have performed numerical simulations using 100×100 pixels for simulation. Since the model is generally described in 1D, the effective area of illumination on the scattering medium is kept at minimum, i.e. choosing a line illumination. It should be noted that the model may be shown in 2D by aligning the vector representation of the region. Along the vertical axis there are 100 pixels whose amplitude values can be changed from 0-255. Along the horizontal direction 3-pixel columns were chosen for line illumination. The pixel size was set as 8μ. Ideally it would mean that a line of light whose amplitude is modulated along the vertical direction is incident on a scattering media. Since we don't want the scattering contribution from other areas of the scattering sample, we block the rest of the area on the scatterrer other than the illumination area, FIGS. 3A and 3B illustrate the limitation of scattering area for use of the simulation herein. FIG. 3A exemplifies a full scattering surface and FIG. 3B exemplifies the scattering area left after the use of a blocking mask on the rest of the area on the scatterrer other than the illumination area. The black color denotes the area blocked to keep the contributions from other areas minimum.

Figure 4:
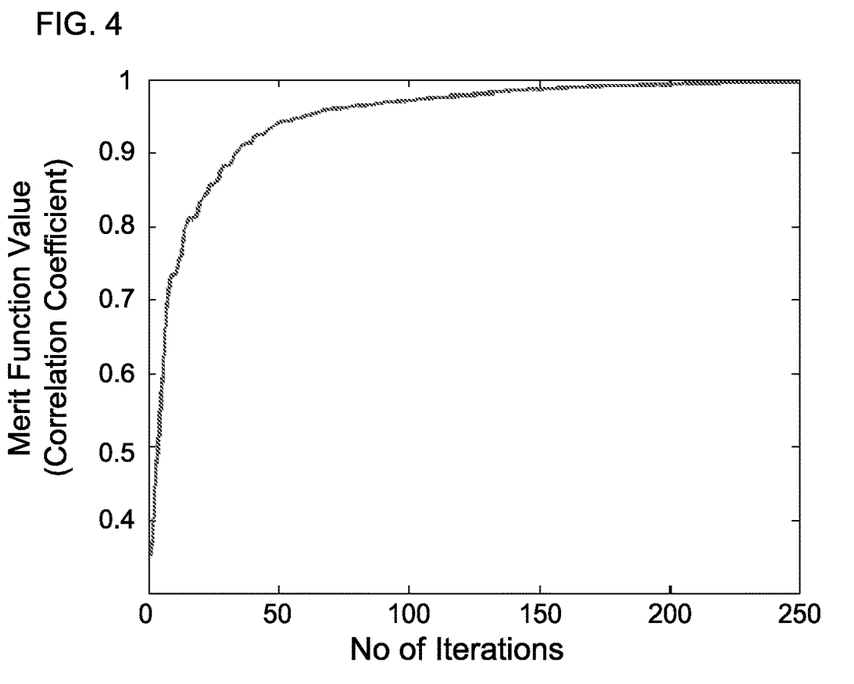
FIG. 4 shows the Merit Function values plotted against number of Iterations used for simulating the present technique.

The Particle Swarm optimization considered a Swarm size of 150 particles, which are known as random solutions. And each of these particles are initialized with certain velocities. Solutions in this case are 100×3 pixel line whose amplitude along the vertical axis varied from 0-255. These solutions provide candidates for the input wavefront encoding intensity $I_{in_j}(x_j)$ which illuminates the scattering sample. The target assumed to be placed 5 mm behind the scattering sample. The propagation from scatterrer to target is done using angular spectrum propagation. We capture the Intensity of the light that comes out of the scattering media after dual passage. We average this intensity to find collected light pattern $I_{out_j}(x_j)$. Then according to Equation 7, we calculate the merit function/objective function as the correlation between these two intensity patterns. Among these random solutions there would be one solution that would have a higher value for the merit function. This would be termed as the Global Best Solution and among for each particle the best solution is termed as Particle Best Solution. Based on Global Best and Particle Best, the position and velocity of the particles are changed. This is one iteration. Likewise, we performed 250 iterations till we reached a higher correlation coefficient value of 0.99 for the merit function. FIG. 4 shows the Merit Function values plotted against number of Iterations.

FIGS. 5A to 5D show $I_{out}$ measurements before optimization (FIG. 5A), after optimization (FIG. 5B), intensity on the target plane before optimization (FIG. 5C), and intensity on the target plane after optimization (FIG. 5D) which shows a sharp focus and reduced scattering.

Figure 5A:
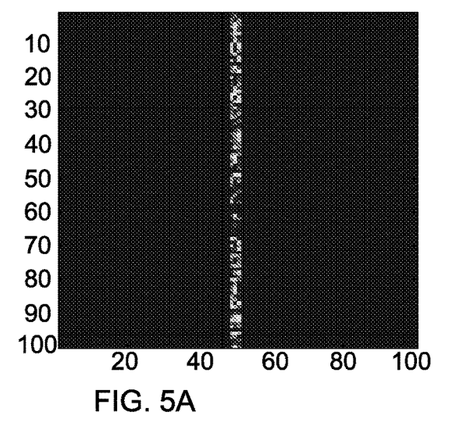
FIGS. 5A to 5D show simulation results for $I_{out}$ measurements before optimization (FIG. 5A), after optimization (FIG. 5B), intensity on the target plane before optimization (FIG. 5C), and intensity on the target plane after optimization (FIG. 5D) which shows a sharp focus and reduced scattering according to some embodiments of the present invention.
Figure 5B:
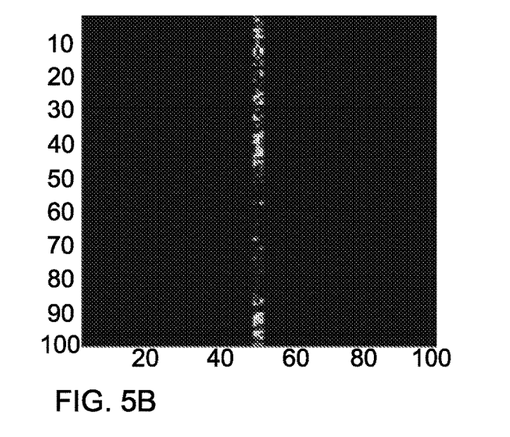
Figure 5C:
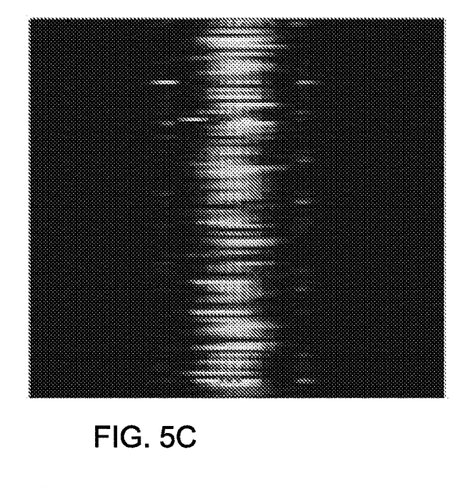

Since we don't access the information from the target plane (the plane behind the scattering media where the spot is to be focused.), we perform the optimization in noninvasive manner. FIGS. 5A and 5B shows the Output intensities measured before and after optimization. However, to verify if we achieved a focus or not, we tried to see the intensity on the target plane. (Shown in FIGS. 5C and 5D). FIGS. 6A and 6B show the corresponding intensity profile plot of FIGS. 5C and 5D respectively.

Figure 5D:
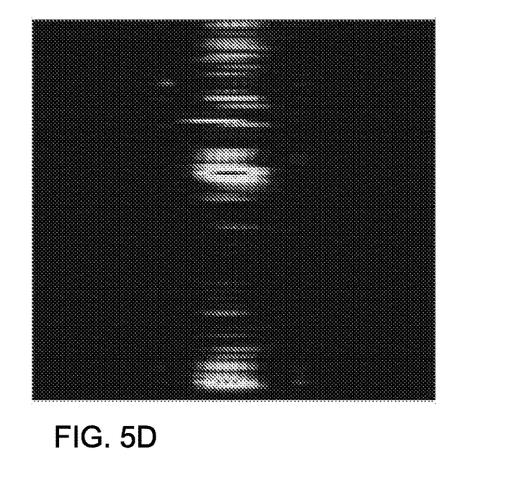
Figure 6A:
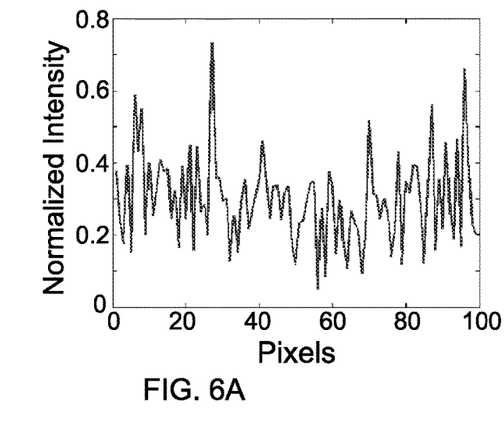
FIGS. 6A and 6B intensity profile plot of FIGS. 5C and 5D respectively.
Figure 6B:
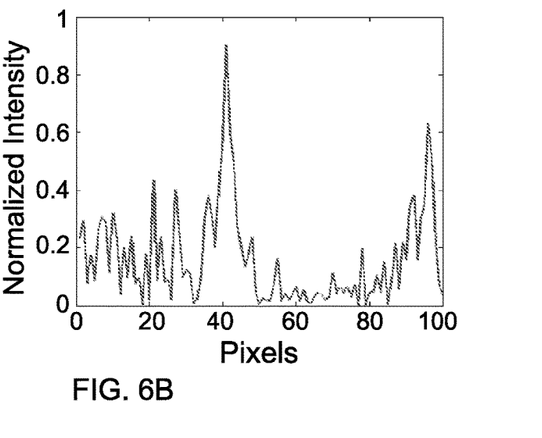

From FIGS. 5D and 6B we get a focused spot on the target plane after suitable amplitude modulation on the incident light. In next set of iteration, the technique can map another focus spot. There by undergoing many such optimization cycles, we would be able to map the entire target plane.

Figure 7:
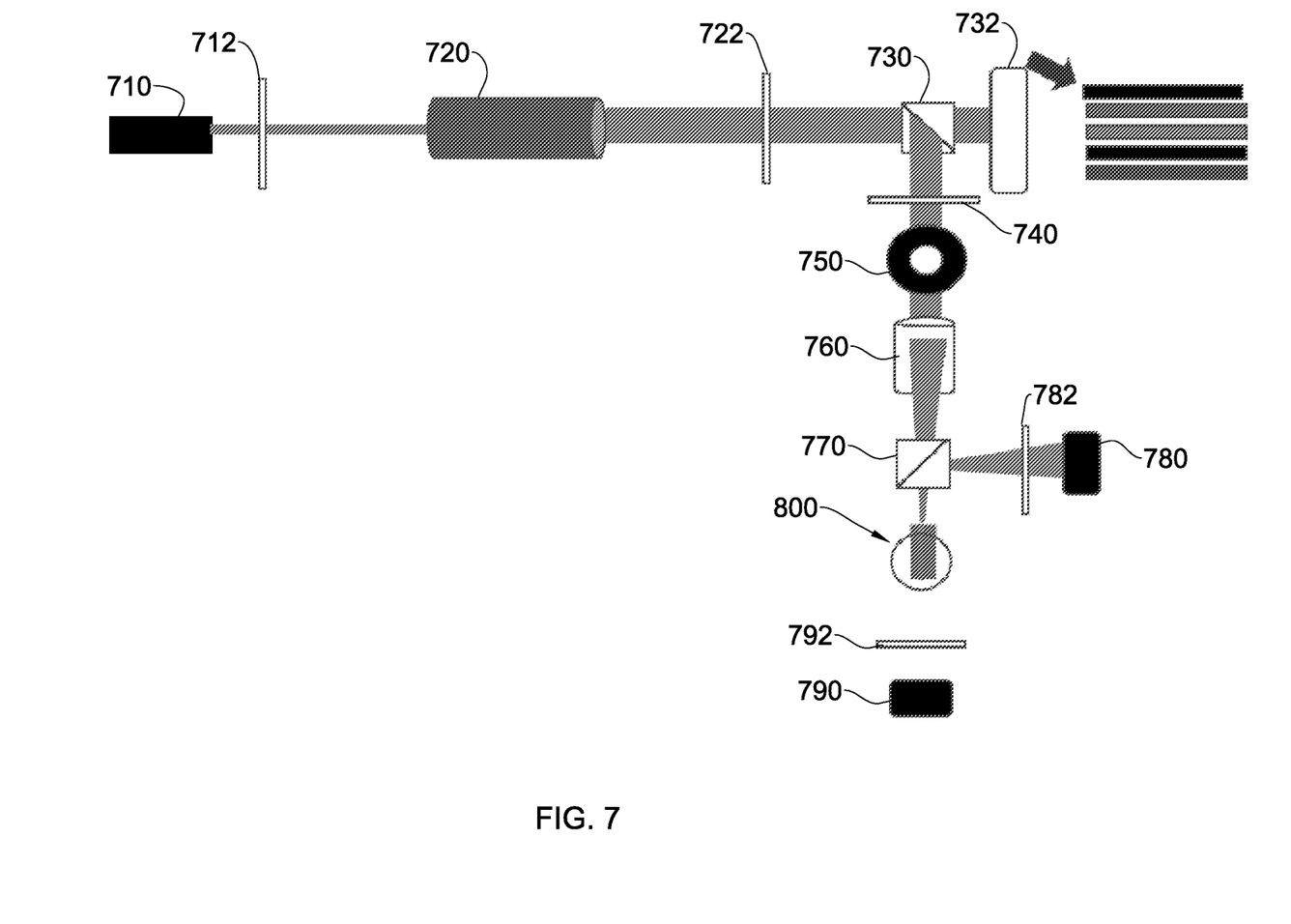
FIG. 7 illustrates experimental system configuration used for verifying the present technique.

The inventors have performed preliminary experiments showing efficiency of the present technique via amplitude modulation for wavefront shaping. The experimental setup is shown in FIG. 7 includes a light source 710 (e.g. 532 nm laser unit) and a polarizer 712 at light output thereof, an optical arrangement 720 configured for collimating the output light and half wave plate 722 positioned to provide selected polarization (e.g. circular polarization). The light is transmitted through or reflected from spatial light modulator 730 (e.g. DMD unit) associated with spatial modulation controller 732 operated to provide selected illumination pattern $E_{in}$ the patterned light may be further polarized by polarizer 740 and filtered by pinhole/aperture 750 to remove high diffraction orders associated with the spatial modulation. The system in this example utilizes a cylindrical lens 760 to produce a focused line having different amplitude patterns there along and for directing the focused line toward the sample 800. The light returning from the sample is directed using beam splitter 770 to camera unit 780 (typically via polarization analyzer 782) to collected pattern of returned light. An additional camera unit 790 and imaging lens unit 792 are positioned downstream of the sample 800 to verify creation of focusing spot. The experimental setup used an LCOS SLM 730 in amplitude mode for providing spatial beam coding to the input wavefront. The sample 800 is formed of a very thin slice chicken breast sample used as diffusing medium and including a reflecting surface at a distance of 2 mm downstream so as to get proper response from the system. The sample 800 is illuminated by a line of different amplitude along each pixel by a cylindrical lens. The light passes twice through the same medium and hence:

$$E_{out_j}(x_j) = A^t * A * E_{in_j}(x_j) \qquad \text{(equation 8)}$$

A is the forward scattering matrix. As per the model described above, in amplitude scheme, for a focused spot we must have:

$$E_{out_j}(x_j) = E_{in_j}(x_j) \qquad \text{(equation 9)}$$

$E_{out_j}$ was measured as Intensity image using CCD1 (THORCAM) camera unit. $E_{in}$ is the amplitude mask that was applied on the SLM 730. We chose Particle Swarm Algorithm (PSO) to perform the optimization. The cost function or the fitness function is the correlation between the $E_{out}$ and $E_{in}$. Hence it becomes a maximization problem. CCD2 (THORCAM) was used to check the focused spot after optimization is complete.

The SLM used is HEO 1080P SC-I (from HoloEye) which contains 1080×1920 pixels of 8 um pixel size. Thus, to keep the computational load minimal, we performed the optimization for 108×108 pixels. This was done by clubbing 10 pixels on SLM. It means that 10 pixels clubbed together would be having the same gray level value. In order to get a line (in which each pixel is different in amplitude), the mask applied on the SLM was in the form of a grating which later transforms into a line with use of cylindrical lens.

Figure 8A:
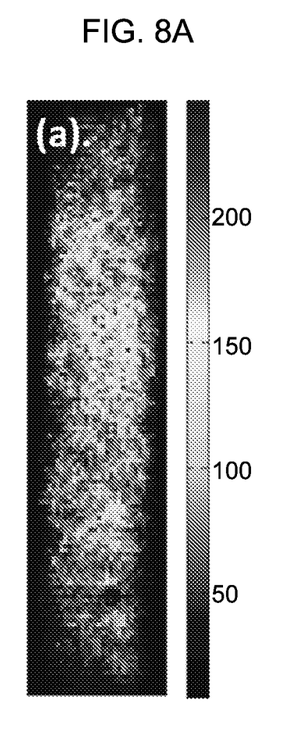
FIGS. 8A and 8B show collected images captured using after passing twice (FIG. 8A) or once (FIG. 8B) through the scattering sample.
Figure 8B:
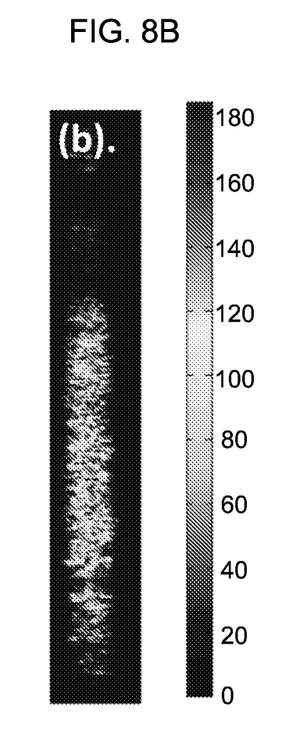

The scattering tissue was a chicken breast. The surface of the chicken was covered allowing only the line of light to pass through. This is done to make the scattering more closely one-dimensional (1D). FIGS. 8A and 8B exemplify results as images captured using camera 780 and camera 790 when there was no modulation applied to the incident light. The scattered light shown in FIG. 8A have passed twice through the scattering medium and the image of FIG. 8B shows light scattering after one pass through the medium.

The $E_{out}$ captured was 145×36 pixels. It was resized to 108×36 pixels. However, to fit with the mathematical formulation the inventors have used 1D output intensity for which the intensity along the y-axis was averaged over 36 pixels. This was reasonable assumption as we had a tissue which was very thin along y-axis.

Figure 9:
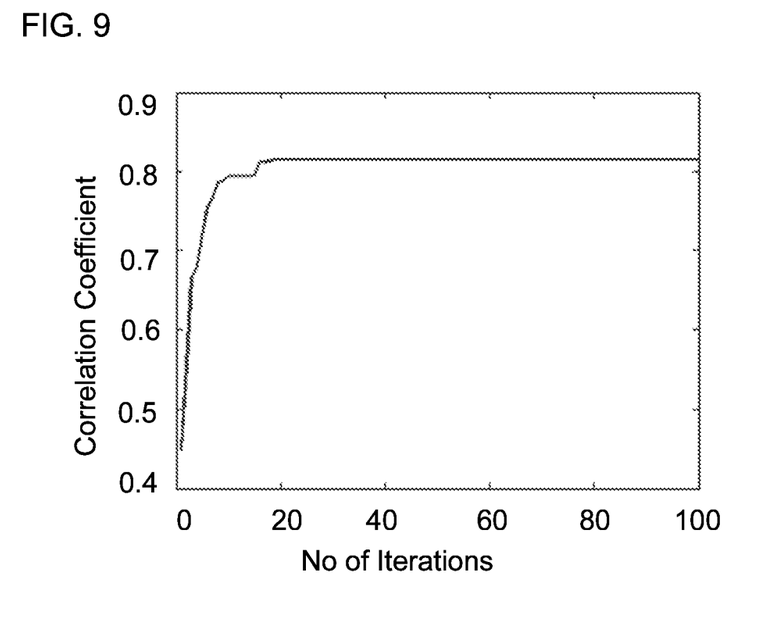
FIG. 9 shows correlation between input and output intensity patterns used for optimization of the input wavefront according to the present technique.

The PSO algorithm was performed. Initially a population of 150 random amplitude masks were created and it was run for 100 iterations. In each iteration we have another 150 iterations. It was seen that after 25 iterations the correlation coefficient reached a value of 0.82 (FIG. 9).

Figure 10A:
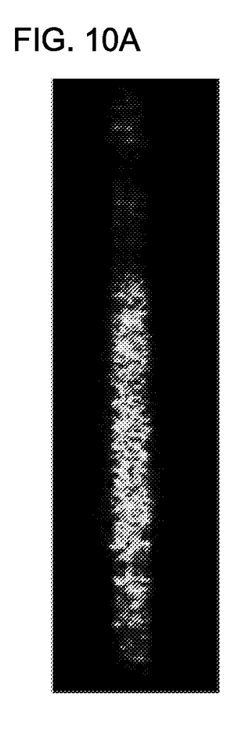
FIGS. 10A to 10E shows before (FIG. 10A) and after (FIG. 10B) optimization results including focus region (FIG. 10C) achieved after passing through the scattering sample, and one dimensional plots of the intensity curve before (FIG. 10D) and after (FIG. 10E) optimization according to some embodiments of the present technique.
Figure 10B:
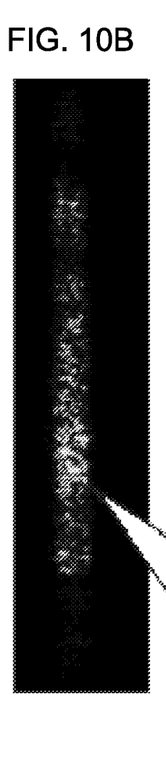
Figure 10C:
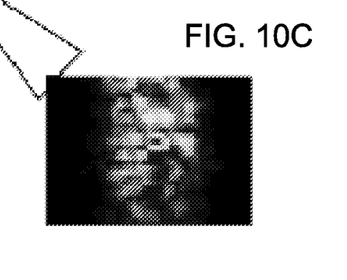
Figure 10D:
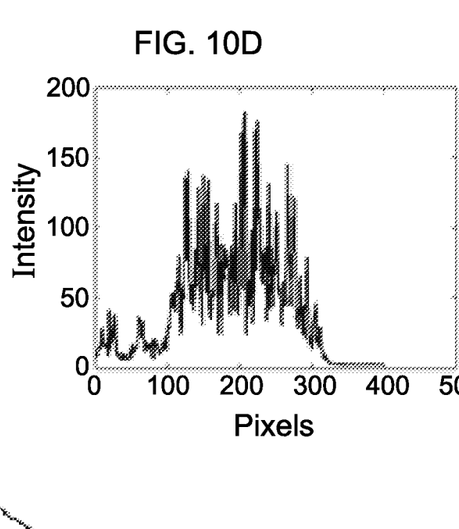
Figure 10E:
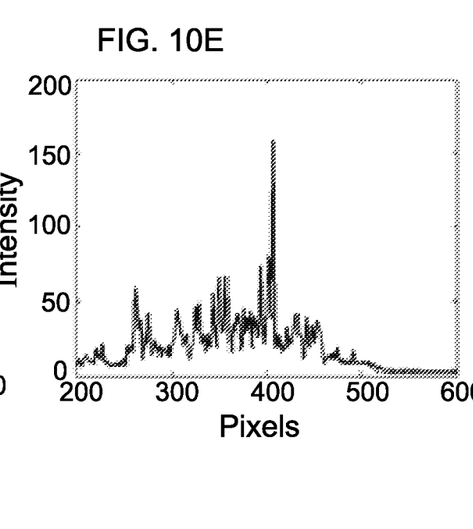

In order to check that focus was generated behind the scattering tissue, the inventors have captured the intensity after one pass through the scattering medium (sample 800) using a second camera unit 790. FIGS. 10A to 10E show a comparison between the initial intensity (FIG. 10A) and the intensity after optimization in one single pass (FIG. 10B). FIG. 10C shows an enlarged image of the focus spot of FIG. 10B. Upon optimization FIG. 10B shows a focused spot with less scattering with respect to the initial spot of FIG. 10A. FIGS. 10D and 10E plot the intensity curve along pixels of the collected light corresponding with the spots in FIGS. 10A and 10B respectively. The peak intensity achieved in FIG. 10E (after focusing) is higher (at least with respect to its surrounding) than the peak intensity achieved in FIG. 10D (before focusing).

Thus, the present invention provides a system and technique enabling imaging, e.g. by scanning, of material located behind scattering medium. The present technique may be operated with a limited number of optimization steps and may allow imaging from different regions of the scattering medium without the need to repeat optimization. Further, the present invention may allow determining wavefront encoding for obtaining image data prom selected depth into the scattering medium after collecting data on imaging from a certain initial depth.

The invention claimed is:

1. A system for use in imaging through diffusive media, the system comprising:
   an imaging unit comprising
      a light source unit comprising at least one light source providing coherent illumination with selected wavelength range and a spatial light modulator configured for selectively varying spatial pattern of wavefront of light generated by the at least one light source; and
      a collection unit comprising at least one detector array and located next to said light source unit for collecting light reflected from a sample being illuminated by said light source unit; and
   a control system comprising at least one processing unit and connected to said light source unit and said collection unit, said control system is configured for selectively varying spatial pattern of wavefront of light generated by the at least one light source in accordance with spatial pattern of light collected by said at least one detector array of the collection unit to satisfy a reflectance condition indicative of relation between spatial pattern of the wavefront and spatial pattern of collected light.

2. The system of claim 1, wherein said reflectance condition indicative is a condition that intensity pattern of collected light is spatially similar, up to constant lose and predetermined threshold variation, to spatial intensity pattern of wavefront of light generated by the at least one light source.

3. The system of claim 2, wherein said reflectance condition corresponds to $I_{in}(x) \approx kI_{out}(x)$, where $I_{in}(x)$ is intensity pattern formed by said spatial pattern of wavefront of generated light, $I_{out}(x)$ is collected intensity pattern, and k is a measure indicative of lose and reflection from a focus region at certain depth into the sample.

4. The system of claim 1, wherein said imaging unit is positioned on a moving platform, said control system is connected to said platform for selectively varying transverse location of the imaging unit with respect to said sample.

5. The system of claim 4, wherein said control system is configured for varying transverse location of the imaging unit with respect to the sample and verifying said reflectance condition in a selected number of different locations.

6. The system of claim 4, wherein said control unit is configured for selectively varying transverse location of the imaging unit with respect to the sample thereby scanning a selected region of the sample, variation in total intensity of collected light pattern being indicative of reflection from a focusing spot at certain depth into the sample, said scanning thereby provides image data indicative of said certain depth into the sample.

7. The system of claim 1, wherein said processing unit comprises a scattering matrix module configured for using data of spatial pattern of wavefront of light suitable to satisfy said reflectance condition for determining an estimated scattering matrix for said sample.

8. The system of claim 7, wherein said processing unit further comprises pattern determining module, said pattern determining module being configured for receiving data on the estimated scattering matrix and using said estimated scattering matrix for determining one or more wavefront patterns suitable for generating focus region within the scattering medium at selected depths.

9. A method for imaging through scattering medium, the method comprising:
   (a) directing coherent illumination wavefront having selected wavelength range and selected spatial pattern onto a sample;
   (b) collecting light returning from the sample and determining spatial pattern of collected light;
   (c) determining a relation between said selected spatial pattern of the coherent illumination wavefront and spatial pattern of collected light; and
   (d) vary spatial pattern of the coherent illumination wavefront until said relation in within predetermined reflectance condition.

10. The method of claim 9, wherein said predetermined reflectance condition is selected to satisfy a condition that spatial pattern of collected light is spatially similar, up to constant lose and predetermined threshold variation, to spatial pattern of the coherent illumination wavefront.

11. The method of claim 10, wherein said predetermined reflectance condition corresponds to $I_{in}(x) \approx kI_{out}(x)$, where $I_{in}(x)$ is intensity pattern formed by said spatial pattern of wavefront of generated light, $I_{out}(x)$ is collected spatial intensity pattern, and k is a measure indicative of lose and reflection from a focus region at certain depth into the sample.

12. The method of claim 9, further comprising varying relative transverse location of illumination with respect to the sample.

13. The method of claim 12, further comprising determining said reflectance condition in a selected number of different transverse locations on the sample.

14. The method of claim 12, further comprising scanning a selected region of the sample, for each measurement position on the sample determining variation in total intensity of collected light pattern with respect to total intensity of said coherent illumination wavefront, and determining data on reflection level arriving from a focusing spot at certain depth into the sample, and generating image data indicative of said certain depth into the sample in accordance with said scanning.

* * * * *